(12) United States Patent
Fang et al.

(10) Patent No.: US 12,137,177 B2
(45) Date of Patent: Nov. 5, 2024

(54) CREDIBLE ALLIANCE BLOCKCHAIN DIGITAL CALIBRATION CERTIFICATE SYSTEM AND OPERATION METHOD THEREFOR

(71) Applicant: NATIONAL INSTITUTE OF METROLOGY, CHINA, Beijing (CN)

(72) Inventors: Xiang Fang, Beijing (CN); Xingchuang Xiong, Beijing (CN); Feng Tian, Beijing (CN); Yichuan Tang, Beijing (CN); Wenkui He, Beijing (CN); Zhen Liu, Beijing (CN)

(73) Assignee: NATIONAL INSTITUTE OF METROLOGY, CHINA, Beijing (CN)

( * ) Notice: Subject to any disclaimer, the term of this patent is extended or adjusted under 35 U.S.C. 154(b) by 109 days.

(21) Appl. No.: 17/609,213

(22) PCT Filed: Mar. 30, 2020

(86) PCT No.: PCT/CN2020/081991
§ 371 (c)(1),
(2) Date: Nov. 5, 2021

(87) PCT Pub. No.: WO2021/168981
PCT Pub. Date: Sep. 2, 2021

(65) Prior Publication Data
US 2022/0393890 A1 Dec. 8, 2022

(30) Foreign Application Priority Data
Feb. 28, 2020 (CN) .......................... 202010130811.9

(51) Int. Cl.
*H04L 9/32* (2006.01)
*H04L 9/00* (2022.01)
*H04L 9/40* (2022.01)

(52) U.S. Cl.
CPC .............. *H04L 9/50* (2022.05); *H04L 9/3247* (2013.01); *H04L 9/3263* (2013.01); *H04L 9/3268* (2013.01); *H04L 63/0823* (2013.01)

(58) Field of Classification Search
CPC ....... H04L 9/50; H04L 9/3263; H04L 9/3268; H04L 63/0823
See application file for complete search history.

(56) References Cited

U.S. PATENT DOCUMENTS

2019/0036711 A1* 1/2019 Qiu ....................... H04L 9/3268
2019/0065709 A1* 2/2019 Salomon ............... H04L 9/0643
(Continued)

FOREIGN PATENT DOCUMENTS

CN  206422795 U  8/2017
CN  108804909 A  11/2018
(Continued)

OTHER PUBLICATIONS

International Search Report and Written Opinion for Application No. PCT/CN2020/081991 dated Nov. 26, 2020.
(Continued)

*Primary Examiner* — Ellen Tran
(74) *Attorney, Agent, or Firm* — MARSHALL, GERSTEIN & BORUN LLP

(57) ABSTRACT

The present invention discloses a trusted alliance block chain digital calibration certificate system and an operation method therefor. The system comprises: a distributed ledger system (10) of a distributed storage system based on a hyperledger fabric; a CA system (11) for management of all entity identity certificates and registration of identities in the system; a UTC time calibration server (12) for providing a UTC time calibration service for all block chain node servers of the system; and a digital calibration certificate subsystem (13) for generating, by means of alliance man- (Continued)

agement, instrument organization management, and calibration institution management, a digital calibration certificate from calibration certificate data by a digital signature technology, extracting related entity information, and forming original information of multiple data blocks. The system can overcome the shortcomings of existing block chain technology-based digital calibration certificate technologies by establishing a calibration chain and a traceability chain which are reliable, trusted, secure, and continuously growing.

8 Claims, 4 Drawing Sheets

(56) References Cited

U.S. PATENT DOCUMENTS

| | | | |
|---|---|---|---|
| 2019/0327216 A1* | 10/2019 | Walters | H04L 9/30 |
| 2020/0065300 A1* | 2/2020 | Yang | H04L 9/50 |

FOREIGN PATENT DOCUMENTS

| | | |
|---|---|---|
| CN | 109034848 A | 12/2018 |
| WO | WO-2020002341 A1 | 1/2020 |

OTHER PUBLICATIONS

Chen, Liping et al., "Research of Integrated Service Management Information System of Testing and Calibration Laboratories", China Measurement & Test. vol. 35, No. 6, Nov. 30, 2009 (Nov. 30, 2009), pp. 30-33.

* cited by examiner

CREDIBLE ALLIANCE BLOCKCHAIN DIGITAL CALIBRATION CERTIFICATE SYSTEM AND OPERATION METHOD THEREFOR

CROSS-REFERENCE TO RELATED APPLICATIONS

This is a U.S. National Phase of International Application No. PCT/CN2020/081991, filed Mar. 30, 2020, which claims priority to Chinese Patent Application No. CN 202010130811.9, filed Feb. 28, 2020, the respective disclosures of which are each incorporated herein by reference in their entireties.

FIELD OF THE DISCLOSURE

The present invention relates to a block chain technology, in particular to a trusted alliance block chain digital calibration certificate system and an operation method therefor.

BACKGROUND

According to the definition in "ISO/IEC Guide 1999", metrology is a measurement science and applications thereof. Metrology comprises all theoretical and practical aspects of measurement, regardless of measurement uncertainty and application fields.

Metrology is an activity to achieve unit unity and accurate quantity values. According to "International Metrology Vocabulary Foundation and General Concepts and Related Terminology (VIM)", metrological traceability is defined as: "A characteristic of a measurement result that links the measurement result with a reference object by an uninterrupted calibration chain specified in the document, every calibration in the calibration chain introduces measurement uncertainty."

From the technical point of view of achieving unit unity and accurate quantity values, verification and calibration are two main methods of quantity value transmission and quantity value traceability of measuring instruments. Among them: verification is an activity in which the legal metrology department or statutory authorized institution, in accordance with the verification regulations, provides a certificate to determine that an indication error of a measuring instrument meets the specified requirements by experiments. Calibration is a set of operations, in which, for the purpose of determining an indication value of a measuring instrument or a measuring system or an indication value represented by a physical measuring tool or a standard material, tests are performed on the same measured object under specified conditions using a high-precision certified standard equipment and measuring equipment, respectively, then the error of the measuring equipment relative to the standard equipment is obtained, thereby a correction value of the indication data of the measuring equipment is obtained.

A conclusion of calibration is only to evaluate a quantity value error of a measuring device and to ensure accuracy of the quantity value. The result of calibration can be given as "Calibration Certificate" or "Calibration Report". The "Calibration Certificate" does not have strict uniform requirements. Usually, the description and agreement of certificate format are made in the corresponding "Calibration Specification" for measuring instruments.

According to ISO17025, calibration certificate is the main communication method for bottom-up quantity value traceability in calibration hierarchy or quality infrastructure.

There is no uniform format for calibration certificates. Generally, a document template is prepared by verification institutions based on "Calibration Certificate" and "Calibration Specification", technical conditions, test data, uncertainty and other data are filled in by a verifier, then the document converted into a pdf file and archived, then paper certificates are printed and sealed.

However, in current digitalization process of calibration certificates, there are several problems in calibration certificates, especially the one that they cannot adapt to the development needs of digital economy era: 1) Certificates are diverse, and specific clauses are defined in various ways, they cannot be machine-readable and calculable, resulting in a requirement for artificial identification of authenticity, pros and cons, which not only consumes a lot of manpower, but is also prone to errors. 2) The format is not uniform, which makes it very difficult to structure certificate information (certificates issued by different verification institutions are different in format; different kinds of certificates for a measuring instrument issued by the same verification institution are different in format; and the same kind of certificates for a measuring instrument issued by different verifiers in the same verification institution may also be different in format). Therefore, it is difficult to accumulate data, resulting in a large-scale data, which makes it even more difficult to realize big data statistics and in-depth mining. 3) Paper certificates or electronic certificates in word or pdf format are easy to be tampered with or falsified. Authenticity identification of a certificate is very heavy (the certificate number can be found on the website of Metrology Institute in several provinces, but it is difficult to identify the authenticity of specific measurement data and content). 4) Each calibration certificate exists independently, making it difficult to establish a clear calibration chain from calibration certificates. A lot of manpower and material resources are required to sort out the calibration chain, but often return without accomplishing anything due to incomplete and uncertain data. Therefore, it is difficult to form a traceability chain of a metrological quantity value. 5) A calibration chain and a traceability chain need to be established manually, which is time-consuming and error-prone. Therefore, the traceability of a quantity value is difficult, time-consuming and laborious, and difficult to meet the needs of the development of digital economy era.

Currently, the Metrology Institute of German (PTB) has developed a digital calibration certificate (DCC) combined with a digital signature technology. The digital calibration certificate is a secure and standardized digital information structure used for calibration, identification, measurement and digital upgrades of the entire calibration level in the quality infrastructure. It can effectively solve problems including non-uniform format, and realize a digital calibration certificate that is computer-readable, calculable and verifiable.

Although the digital calibration certificate proposed by PTB has many advantages, and solves some problems including that calibration certificates are difficult to adapt to the development of digital economy, but it still cannot solve problems in following aspects: 1) Since digital certificates are stored in a centralized institution, it cannot be completely tamper-proof and non-repudiation at the technical level (in case of a problem occurring in the data storage institution); 2) Digital calibration certificates are isolated, and two certificates are independent, there is no continuously growing reliable chain. Manual re-processing and re-establishment of the system is required, which is time-consuming and laborious, and easy to introduce errors or fraud, causing of mistrust in another aspect; 3) Without a reliable and trusted complete data chain, it is difficult to form a calibration chain and a traceability chain which are reliable and trusted, and verification and supervision can only be performed randomly or locally, which is ineffective and consumes a lot of manpower and material resources.

SUMMARY

Based on the above, the main purpose of the present invention is to provide a trusted (credible) alliance block chain digital calibration certificate system and an operation method therefor, by establishing a calibration chain and a traceability chain which are reliable, trusted, secure, and continuously growing, to overcome the shortcomings of existing block chain technology described above and to meet the needs of the development of digital economy.

To achieve the above purpose, technical solutions of the present invention are as follows:

a trusted alliance block chain digital calibration certificate system, the system comprises: a distributed ledger system 10, a certification authority (CA) system 11, a coordinated universal time (UTC) time calibration server 12, and a digital calibration certificate subsystem 13; wherein:

the distributed ledger system 10 is a distributed storage system based on a hyperledger fabric;

the CA system 11 is used for management of all entity identity certificates and registration of identities in the system;

the UTC time calibration server 12 is used for providing a UTC time calibration service for all block chain node servers of the system; and the digital calibration certificate subsystem 13 is used for generating, by means of alliance management, instrument organization management, and calibration institution management, a digital calibration certificate from calibration certificate data by a digital signature technology, extracting related entity information, and forming original information of multiple data blocks.

Wherein: the system further comprises a public query subsystem 14, which is used for providing for the public with query services including verifying authenticity of calibration certificates, verifying whether a measurement value specified thereof has a calibration certificate, and whether a traceability chain of a quantity value is complete.

The distributed ledger system 10 comprises at least one block chain node 101, and the block chain node 101 is associated with the CA system 11, the UTC time calibration server 12, the digital calibration certificate subsystem 13 and the public query subsystem 14, respectively.

The digital calibration certificate subsystem 13 comprises a digital calibration certificate module 131, which further comprises a calibration institution management module 1312, an instrument organization management module 1313 and an alliance management module 1314; wherein, the calibration institution management module 1312 is an institution with calibration qualifications and calibration capabilities; the instrument organization management module 1313 is a functional module through which the calibration institution management module 1312 with commission for measuring instruments performs calibration on its instruments; the alliance management module 1314 is a maintainer for public and published information of an alliance chain.

The calibration institution management module 1312 further comprises a calibrator module 13121, a verifier module 13122, an approver module 13123 and an error verifier module 13124.

The calibration certificate data specifically is data that has been submitted by a calibrator, verified by a verifier, and approved by an approver.

An operation method of a trusted alliance block chain digital calibration certificate system, the method comprises the following steps:
- A. a step for registering and managing all entity identity certificates in the system network;
- B. a step for submitting materials of applying for instrument calibration;
- C. a step for submitting data and information of instrument calibration;
- D. a step for submitting data after verification by a verifier and approval by an approver;
- E. a step for generating block data of multiple data chains of a digital calibration certificate chain based on calibration certificate information submitted by a calibrator, verified by a verifier, approved by an approver, and their respective digital signatures;
- F. a step for the block data on-chaining based on a hyperledger fabric system technology.

Wherein: the step D further comprises the following step: if a problem is found, return back to step C, and re-submit and re-verify after the information has been corrected by a calibrator module.

After the step A, the method further comprises:
- B'. a step for the calibrator or calibration instrument organization for applying for marking incorrect calibration;
- C'. a step for an error verifier for verifying the calibration certificate information and submitting to an approver after an error is confirmed;
- D'. a step for submitting after approval by the approver, and then performing step E.

The step C' further comprises the following step: if other problems are found, return back to step B' for application.

The step D' further comprises the following step: if a problem is found, perform step C', i.e., return back to the error verifier for re-verification and then re-submitting.

After the step F, the method further comprises: G. a step for querying and processing the block data of the trusted block chain digital calibration certificate system.

The trusted alliance block chain digital calibration certificate system and the operation method therefor in the present invention have beneficial effects such as:

1) The distributed storage based on a hyperledger fabric technology (that is, not only storage in a central institution) ensures that it is completely tamper-proof and non-repudiation at the technical level. Block data can only be added, not modified or deleted; even if the subsequent new version of data can respectively add data only according to the new version, the previous data on the block chain is still cannot be changed and affected. Therefore, it can ensure that the data is tamper-proof and non-repudiation.

2) All originally isolated digital calibration certificates in the alliance chain are stringed together in accordance with a unified coordinated universal time (UTC) traceable high-precision time to form a continuously growing reliable data chain. Extract related entity information of the digital calibration certificate to form multiple (9 in embodiments of the present invention) related data blocks while forming data blocks of the digital calibration certificate, thus multiple (10 in embodiments of the present invention) data block chains which are reliable, trusted and closely related are formed. Compared to the method in prior art for storing simple digital calibration certificate block chains and then extracting data from the block chain information, the solution of the present invention ensures quality and efficiency at the source of data, eliminates the need of manual re-processing and re-establishment of the system, and avoids introduction of new mistrust such as a secondary error or fraud, and is time-saving, labor-saving, efficient and accurate as well.

3) In embodiments of the present invention, by means of 10 data block chains such as reliable and trusted complete digital calibration certificates, transmission information of a certain quantity value is directly extracted/queried from the chain, and it is easy to form reliable and trusted calibration chains and traceability chains based on time and transmission relationship. Then the government, during verification supervision/alliance supervision, can efficiently obtain transmission information, comparison information and others of a quantity value, and obtain reliable data directly and efficiently. Based on the reliable multiple data chains, reliable smart contracts or smart application apps can be further realized, for examples, service functions such as verifying whether a certificate is compliant and reminding that calibration equipment is about to expire.

4) The present invention can establish a unified alliance chain for different countries or regions (such as North China, Central China, South China, West China, East China), which conforms to the national calibration plan and relevant regulations, and has a unified data format, thus facilitating efficient integration of data. Based on this, for consumers, it is possible to quickly verify whether the guided measuring instrument or equipment has been calibrated within a specified time and whether a certificate is authentic; for an authorized calibration institution, it is possible to efficiently count the workload and quality of all calibrators, verifiers, approvers, and error verifiers in the institution, and the distribution of service objects (organizations of instrument or equipment), and others; for the organizations of instrument or equipment, it is possible to efficiently inquire about calibration and measurement capabilities of relevant authorized calibration institutions, and the calibration status of present organization's equipment.

5) A unified UTC traceable high-precision time is used in the solution of the present invention, which can not only make the time for each node server of the block chain trace to a unified UTC high-precision time, but also record uniformly the time stamp of digital certificate generation in each data block. Time frequency is the most accurate measurable physical quantity in metrology, and has a special meaning. By means of authorized unified UTC traceable high-precision time, information and data of certificate transmission of other quantity values are associated, which not only provides guidelines for works in the future that research quantity values, such as a social transmission path, but also provides connection basis for fusion and linkage of the present alliance chain with alliance chain data in other fields.

DETAILED DESCRIPTION

The present invention will be further described in detail below in conjunction with accompanying drawings and embodiments of the present invention.

The basic design ideas of the present invention: 1) The present invention focuses on metrological calibration and calibration certificate systems. 2) Compared with centralized storage of the most advanced digital calibration certificate proposed by the German PTB, the present invention adopts a distributed accounting and synchronous storage for an alliance chain, which is multi-centered, securer, tamper-proof, and non-repudiation. 3) Compared with independence of the most advanced digital calibration certificate proposed by the German PTB, the present invention, based on a block chain technology, establishes reliable calibration chains and traceability chains of quantity values, life chains of calibration activities for measuring instruments, working chains of calibration behaviors for calibration workers, working chains of calibration activities for calibration institutions, traceability chains of calibration specifications. Each data chain is tamper-proof, non-repudiation, clearly visible, easy to verify, and efficient to trace. The "calibration chain" of a quantity value established in this way not only ensures reliability of a single measurement node, but also makes "a calibration main chain and a measurement chain" of a quantity value obvious, easy to verify, and efficient for supervision. 4) In the trusted block chain digital calibration certificate system of the present invention, a unique digital identification number (ID) is created for pivotal entities and virtual entities such as each on-chain measuring instrument, calibration worker, calibration institution, calibration specification, institution proposed an inspection, measurement capability (quantity value), and others. The calibration chain of a quantity value is a virtual concept; the calibration chain of a quantity value is carried and realized by a digital calibration certificate chain.

Figure 1:
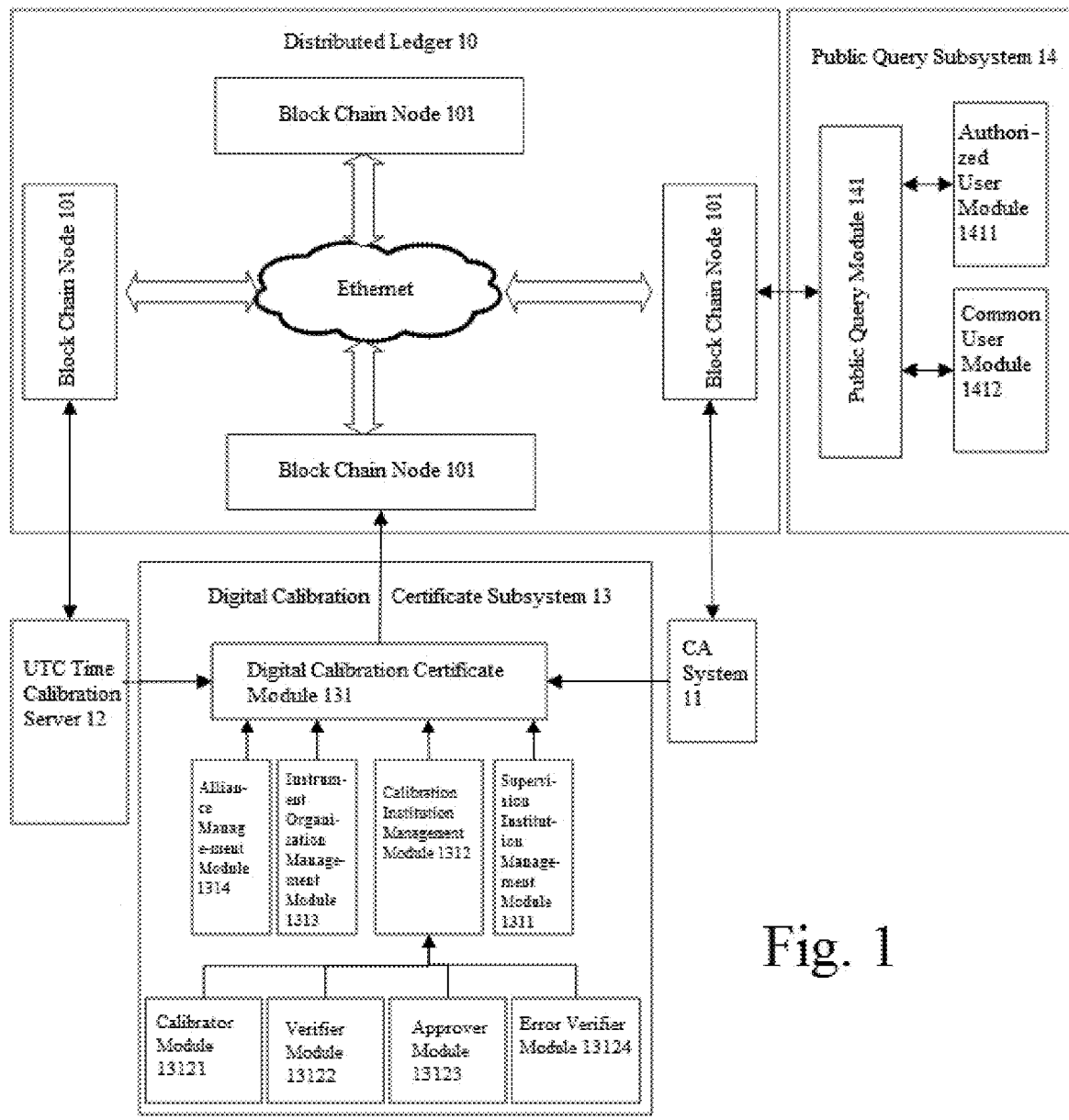
FIG. 1 is a functional block diagram of a trusted alliance block chain digital calibration certificate system according to an embodiment of the present invention.

FIG. 1 is a functional block diagram of a trusted alliance block chain digital calibration certificate system according to an embodiment of the present invention.

As shown in FIG. 1, the trusted alliance block chain digital calibration certificate system comprises a distributed ledger system 10, a certification authority (CA) system 11, a coordinated universal time (UTC) time calibration server 12, a digital calibration certificate subsystem 13, and a public query subsystem 14.

The distributed ledger system 10 is a distributed storage system based on a hyperledger fabric, and belongs to an alliance chain. Distributed storage, that is, not only storage in a centralized institution, can ensure that it is completely tamper-proof and non-repudiation at the technical level. The block chain node 101 is an authorized node in the distributed ledger system 10. There is a popularity of nodes. The working mechanism of nodes is based on the node configuration and operation in the hyperledger fabric system, and there is nothing special. Each block chain node 101 is associated with the CA system 11, the UTC time calibration server 12, the digital calibration certificate subsystem 13, and the public query subsystem 14.

The CA system 11 is a hyperledger fabric CA system, and is used for works, such as management of all entity identity certificates and registration of identities in the system website. Specifically, the CA system 11 is responsible for providing registration and management of identities for entities in the block chain node 101 and entities in the digital calibration certificate system 13.

The UTC time calibration server 12 is used for providing coordinated universal time (UTC) time calibration services for all the block chain node 101 servers of the system to ensure that the block chain node server time and data block built-in time stamps of the system have uniform high accuracy and are synchronized with the world standard time; and also ensure that information of each digital calibration certificate has the same ultra-high-precision time frequency information (each data block contains a "traceable high-precision time stamp", which will be described in detail in data block members below).

The digital calibration certificate subsystem 13 comprises a digital calibration certificate module 131, which further comprises a government supervision institution management module 1311, a calibration institution management module 1312, and an instrument organization management module 1313. The calibration institution management module 1312 further comprises a calibrator module 13121, a verifier module 13122, an approver module 13123, and an error verifier module 13124.

In the digital calibration certificate subsystem 13, the calibration institution management module 1312 is an institution with calibration qualifications and calibration capabilities; the instrument organization management module 1313 is a functional module through which the calibration institution management module 1312 with commission for measuring instruments performs calibration on its instruments; the supervision institution management module 1311 is a metrological supervision institution of governments at all levels; the alliance management module 1314 is the maintainer for the public and published information of the alliance chain, responsible for registration and maintenance of information of national calibration specification, information of public measurement primary standard/standard, a list of calibration measurement capability, and information of authorized calibration institution.

The digital calibration certificate module 131 is used for generating a digital calibration certificate from calibration certificate data (submitted by the calibrator module 13121, verified by the verifier module 13122, and approved by the approver module 13123) by a digital signature technology, extracting related entity information, and forming an original information system of multiple (10 in this embodiment) data blocks (see the description of data block members below for details).

The calibrator module 13121, the verifier module 13122, the approver module 13123, and the error verifier module 13124 all belong to the calibration institution management module 1312, and are used to specifically engage in the work in key links of calibration of instrument quantity values. The general process of calibration is as follows: the instrument organization management module 1313 applies to a certain calibration institution management module 1312 for calibration to its instrument (denoted as instrument A), and the calibrator module 13121 of the calibration institution management module 1312 performs calibration on instrument A using a standard in accordance with calibration specification to form calibration measurement data, which is submitted subsequently. The verifier module 13122 verifies whether calibration conditions, calibration specifications, and measurement data are in compliance. If compliant, then submitted to the approver module 13123 for approval. After an approval by the approver module 13123, original information of the calibration certificate is generated. Finally, the digital calibration certificate module 131 is responsible for digital encryption, data extraction and on-block chaining system.

Preferably, the system also comprises a public query subsystem 14, specifically including a public query module 141, an authorized user module 1411 and a common user module 1412. The public query module 141 is used to verify authenticity of calibration certificates for the authorized user module 1411 and the common user module 1412, and can verify whether a measurement value specified thereof has a calibration certificate, and whether a traceability chain of a quantity value is complete. For the authorized user module 1411, it is possible to view details such as calibration data based on authorized authorities.

Figure 2A:
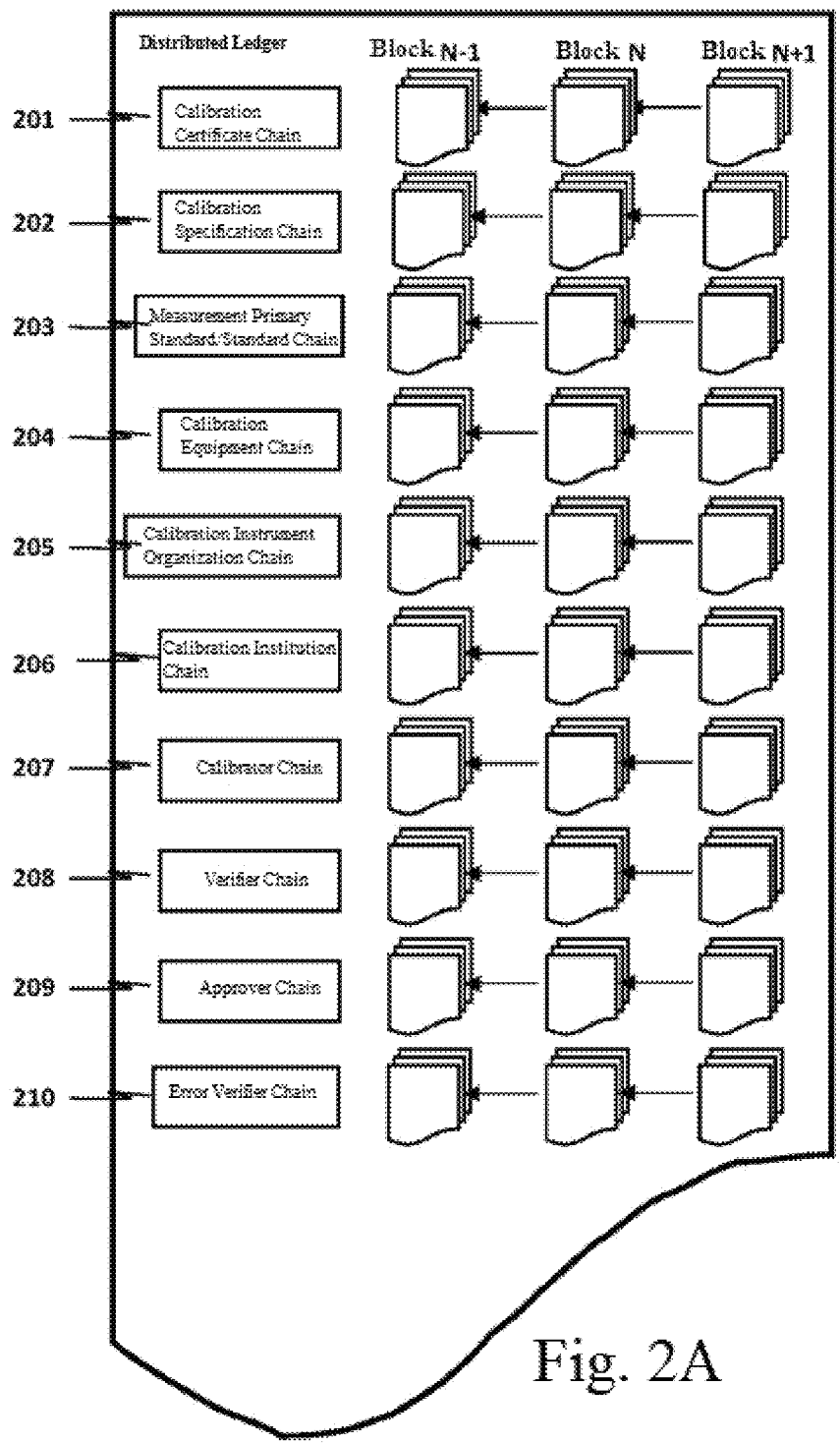
FIG. 2A is a schematic diagram of distributed ledger data block of a trusted alliance block chain digital calibration certificate system according to an embodiment of the present invention.

FIG. 2A is a schematic diagram of distributed ledger data block of a trusted alliance block chain digital calibration certificate system according to an embodiment of the present invention.

As shown in FIG. 2A, the distributed ledger data block of the trusted alliance block chain digital calibration certificate system comprises a digital calibration certificate chain 201 and entity data chains closely related to the calibration certificate, which are established based on a hyperledger fabric, and the entity data chains include 9 data block chains: a calibration specification chain 202, a measurement primary standard/standard chain 203, a calibration equipment chain 204, a calibration equipment organization chain 205, a calibration institution chain 206, a calibrator chain 207, a verifier chain 208, an approver chain 209, an error verifier chain 210.

Figure 2B:
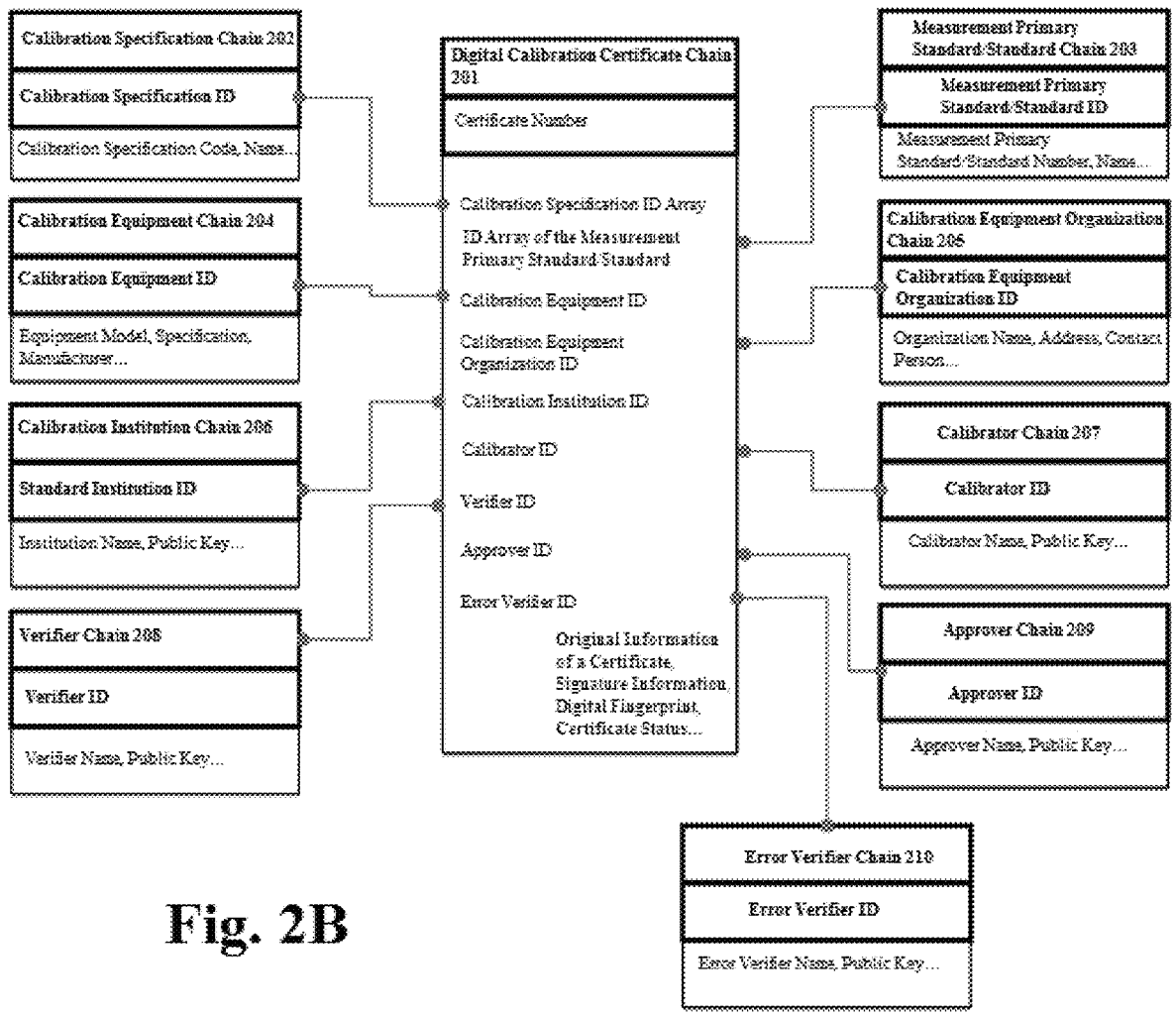
FIG. 2B is a schematic diagram of data structure for distributed ledger data block of a trusted alliance block chain digital calibration certificate system according to the embodiment of the present invention.

In the above 10 data block chains (see FIG. 2B), the digital calibration certificate chain 201 is the core data block chain, and this block data contains "digital calibration certificate ID" and "traceable high-precision time stamps" (not shown in FIG. 2B). The other 9 data block chains all contain these two data members to ensure consistency and relevance of information of the same digital calibration certificate. The core data IDs of the other 9 data blocks are also included meanwhile for easy retrieval and association. Therefore, the 10 data block chains are closely related, and for each newly added digital calibration certificate, a corresponding data block is added to the 10 data block chains.

The digital calibration certificate chain 201 is the core data block chain, and is mainly used to store certificate information, relevant institutions, relevant personnel information and their digital signatures, and other information of the digital calibration certificate. It contains 21 data members (upgrade, addition or deletion of data members can be made based on this version, and a set of versions corresponds to a set of data structure definitions), and the roles/functions of the data members are described as follows:

| Nos | Data member | Role/function | Description |
|---|---|---|---|
| | | Digital calibration certificate chain 201 | |
| 1 | Digital calibration certificate ID | Composed of multiple character strings representing a certain meaning; in block chains, it can be searched by combination of ID | The unique identification number of this digital certificate |
| 2 | Digital calibration certificate version number | The version number of the data structure of this digital certificate, in order to distinguish data structures in different periods, and to facilitate version upgrade of block chains | Marking the version of a digital calibration certificate |
| 3 | Original information of a digital calibration certificate | All original information of a digital calibration certificate, generally in xml format | Original information of a calibration certificate submitted by a calibrator |
| 4 | Sha256 of original information of a digital calibration certificate | Digital fingerprint of original information of a digital calibration certificate | Digital fingerprint of original information of a digital calibration certificate |
| 5 | Digest method of a digital calibration certificate signature | The name of the digest method used by the digital signature, for example: sha256 | The name of the digest method adopted by the digital signature |
| 6 | Digital signature 1 of a digital calibration certificate [calibrator] | Digital signature of a calibrator ensures that this digital certificate is authorized by this calibrator; this signature can be verified by the certificate of this calibrator | Digital signature information of the calibrator of this digital certificate |
| 7 | Digital signature 2 of a digital calibration certificate [verifier] | Digital signature of a verifier ensures that this digital certificate is authorized by this verifier; this signature can be verified by the CA certificate of this verifier | Digital signature information of the verifier of this digital certificate |
| 8 | Digital signature 3 of a digital calibration certificate [approver] | Digital signature of an approver ensures that this digital certificate is authorized by this approver; this signature can be verified by the CA certificate of this approver | Digital signature information of the approver of this digital certificate |
| 9 | Digital signature 4 of a digital calibration certificate [error verifier] | If there is an error in a certificate, an error verifier is required to deal with it; digital signature of an error verifier ensures that this digital certificate is authorized by this error verifier; this signature can be verified by the CA certificate of this error verifier | Digital signature information of the error verifier of this digital certificate, this signature can be empty |
| 10 | Traceable high-precision time stamp | Giving a high-precision timestamp traceable to UTC | UTC high-precision time stamp when this certificate is generated |
| 11 | Certificate status | If there is an error in a certificate, the status of this certificate is marked as "error", and the certificate in error state is an invalid certificate | Indicating the status of this certificate: valid/error |
| 12 | Calibration certificate institution number | Used to record the calibration certificate number defined by the calibration institution | The calibration certificate number defined by the calibration institution |
| 13 | Calibration institution ID | The calibration institution of this certificate corresponds to the ID on the calibration institution chain 206, which can quickly locate the calibration institution and obtain detailed information of the calibration institution; the use of ID outreach can reduce volume of block chains | ID of the calibration institution from which this certificate comes |
| 14 | Calibrator ID | The calibrator of this certificate corresponds to the ID on the calibrator chain 207, which can quickly locate the calibrator and obtain detailed information of the calibrator; the use of ID outreach can reduce volume of block chains | ID of the calibrator who submitted this certificate |
| 15 | Verifier ID | The verifier of this certificate corresponds to the ID on the verifier chain 208, which can quickly locate the verifier and obtain detailed information of the verifier; the use of ID outreach can reduce volume of block chains | ID of the verifier who verified this certificate |
| 16 | Approver ID | The approver of this certificate corresponds to the ID on the approver chain 209, which can quickly locate the approver and obtain detailed information of the approver; the use of ID outreach can reduce volume of block chains | ID of the approver who approved this certificate |
| 17 | Error verifier ID | If there is an error verification process, the error verifier of this certificate corresponds to the ID on the error verifier chain 210, which can quickly locate the error verifier and obtain detailed information of the error verifier; the use of ID outreach can reduce volume of block chains | Can be empty |

-continued

| | | Digital calibration certificate chain 201 | |
|---|---|---|---|
| Nos | Data member | Role/function | Description |
| 18 | Calibration equipment organization ID | ID of the calibration equipment organization of this certificate on the calibration equipment organization chain 205, which can quickly locate the calibration equipment organization and obtain detailed information of the calibration equipment organization; the use of ID outreach can reduce volume of block chains | ID of the organization where the equipment that this certificate corresponds to is located |
| 19 | Calibration equipment ID | ID of the equipment that this certificate corresponds to on the calibration equipment chain 204, which can quickly locate the equipment and obtain detailed information of the equipment; the use of ID outreach can reduce volume of block chains | ID of the equipment that this certificate corresponds to |
| 20 | Calibration specification ID array | One or more IDs used in this certificate on the calibration specification chain 202, which can quickly obtain information of the calibration specification; the use of ID outreach can reduce volume of block chains | ID of the calibration specification series used in this certificate |
| 21 | ID array of the measurement primary standard/standard number used | One or more IDs used in this certificate on the measurement primary standard/standard chain 203, which can quickly obtain information of the measurement primary standard/standard; the use of ID outreach can reduce volume of block chains | ID of the measurement primary standard/standard number series used in this certificate |

The calibration specification chain 202 is used to store the information of calibration specification adopted in calibration activities reflected in the digital calibration certificate. It contains 6 data members (upgrade, addition or deletion of data members can be made based on this version, and a set of versions corresponds to a set of data structure definitions), and the roles/functions of the data members are described as follows:

| | | Calibration specification chain 202 | |
|---|---|---|---|
| Nos | Data member | Role/function | Description |
| 1 | Calibration specification ID | One ID corresponds to one calibration specification, providing fast positioning and traceability functions | Corresponding to the ID of calibration specification adopted by the calibration certificate |
| 2 | Calibration specification code | Recording the calibration specification code used | Code of this calibration specification |
| 3 | Calibration specification name | Recording the name of the calibration specification used | Name of this calibration specification |
| 4 | ID of the last digital calibration certificate of this calibration specification | A list of chains for all digital calibration certificates under this calibration specification is provided by traceability of modification records for this ID | Corresponding to the ID of the last digital calibration certificate |
| 5 | Traceable high-precision time stamp | Giving a high-precision timestamp traceable to UTC | Same as the corresponding digital calibration certificate |

The measurement primary standard/standard chain 203 is responsible for storing the information of measurement primary standard/standard adopted in calibration activities reflected in the digital calibration certificate. It contains 5 data members (upgrade, addition or deletion of data members can be made based on this version, and a set of versions corresponds to a set of data structure definitions), and the roles/functions of the data members are described as follows:

| | | Measurement primary standard/standard chain 203 | |
|---|---|---|---|
| Nos | Data member | Role/function | Description |
| 1 | Measurement primary standard/standard ID | One ID corresponds to one measurement primary standard/standard, providing fast positioning and traceability functions | Corresponding to the ID of Measurement primary standard/standard adopted by the calibration certificate |

-continued

| Measurement primary standard/standard chain 203 | | | |
|---|---|---|---|
| Nos | Data member | Role/function | Description |
| 2 | Measurement primary standard/standard certificate number | Recording the measurement primary standard/standard certificate number used | Number of this measurement primary standard/standard |
| 3 | Measurement primary standard/standard name | Recording the name of the measurement primary standard/standard used | Name of this measurement primary standard/standard |
| 4 | ID of the last digital calibration certificate of this measurement primary standard/standard | A list of chains for all digital calibration certificates under this measurement primary standard is provided by traceability of modification records for this ID | Corresponding to the ID of the last digital calibration certificate |
| 5 | Traceable high-precision time stamp | Giving a high-precision timestamp traceable to UTC | Same as the corresponding digital calibration certificate |

The calibration equipment chain 204 is responsible for storing the information of calibration equipment object reflected in the digital calibration certificate. It contains 8 data members (upgrade, addition or deletion of data members can be made based on this version, and a set of versions corresponds to a set of data structure definitions), and the roles/functions of the data members are described as follows:

| Calibration equipment chain 204 | | | |
|---|---|---|---|
| Nos | Data member | Role/function | Description |
| 1 | Calibration equipment ID | One ID corresponds to one calibration equipment, providing fast positioning and traceability functions | Corresponding to the ID of calibration equipment of the calibration certificate |
| 2 | Calibration equipment model | Recording the calibration equipment model | Calibration equipment model |
| 3 | Calibration equipment specification | Recording the calibration equipment specification | Calibration equipment specification |
| 4 | Calibration equipment factory number | Recording the calibration equipment factory number | Calibration equipment factory number |
| 5 | Calibration equipment manufacturer | Recording the name of the calibration equipment manufacturer | Calibration equipment manufacturer |
| 6 | Standard equipment organization ID | Detailed information of the calibration equipment organization can be obtained by associating calibration equipment organization chain 205 | ID of the organization that this calibration equipment belongs to |
| 7 | ID of the last digital calibration certificate of this calibration equipment | A list of chains for all digital calibration certificates under this calibration equipment is provided by traceability of modification records for this ID | Corresponding to the ID of the last digital calibration certificate |
| 8 | Traceable high-precision time stamp | Giving a high-precision timestamp traceable to UTC | Same as the corresponding digital calibration certificate |

The calibration equipment organization chain 205 is responsible for storing the information of organization that the calibration equipment reflected in the digital calibration certificate belongs to. It contains 7 data members (upgrade, addition or deletion of data members can be made based on this version, and a set of versions corresponds to a set of data structure definitions), and the roles/functions of the data members are described as follows:

| Calibration equipment organization chain 205 | | | |
|---|---|---|---|
| Nos | Data member | Role/function | Description |
| 1 | Calibration equipment organization ID | One ID corresponds to one calibration equipment organization, providing fast positioning and traceability functions | ID of the organization where the corresponding instrument or equipment is located |
| 2 | Organization name | Recording the name of the calibration equipment organization | Calibration equipment organization name |
| 3 | Address | Recording the address of the calibration equipment organization | Address where the calibration equipment organization is located |
| 4 | Contact person | Recording the contact person of the calibration equipment organization | Contact person of the calibration equipment organization |
| 5 | Contact information | Recording the contact information of the calibration equipment organization | Contact information (phone number) of the calibration equipment organization |
| 6 | ID of the last digital calibration certificate of this equipment certificate organization | A list of chains for all digital calibration certificates under this equipment organization is provided by traceability of modification records for this ID | Corresponding to the ID of the last digital calibration certificate |
| 7 | Traceable high-precision time stamp | Giving a high-precision timestamp traceable to UTC | Same as the corresponding digital calibration certificate |

The calibration institution chain 206 is responsible for storing the information of calibration structure of this digital calibration certificate. It contains 7 data members (upgrade, addition or deletion of data members can be made based on this version, and a set of versions corresponds to a set of data structure definitions), and the roles/functions of the data members are described as follows:

| Calibration institution chain 206 | | | |
|---|---|---|---|
| Nos | Data member | Role/function | Description |
| 1 | Calibration institution ID | One ID corresponds to one calibration institution, providing fast positioning and traceability functions | ID of the calibration institution from which this certificate comes |
| 2 | Institution name | Recording the name of the calibration institution | Name of the calibration institution |
| 3 | Certificate number | Recording the certificate number from the calibration institution | Certificate number from the calibration institution |
| 4 | Signature from supervision institutions for the calibration institution | Providing credibility guarantee of this calibration institution, and the signature from supervision institutions indicates that this calibration institution has been authorized by supervision institutions | Signature data from supervisions institution for this calibration institution |
| 5 | Public key | Providing CA certificate for external verification | Public key of external signature of this calibration institution |
| 6 | ID of the last digital calibration certificate of this calibration institution | A list of chains for all digital calibration certificates under this calibration institution is provided by traceability of modification records for this ID | Corresponding to the ID of the last digital calibration certificate |
| 7 | Traceable high-precision time stamp | Giving a high-precision timestamp traceable to UTC | Same as the corresponding digital calibration certificate |

The calibrator chain 207 is responsible for storing the information of calibrator who completed this calibration activity and submitted the calibration certificate. It contains 8 data members (upgrade, addition or deletion of data members can be made based on this version, and a set of versions corresponds to a set of data structure definitions), and the roles/functions of the data members are described as follows:

| | | Calibrator chain 207 | |
|---|---|---|---|
| Nos | Data member | Role/function | Description |
| 1 | Calibrator ID | One ID corresponds to one calibrator, providing fast positioning and traceability functions | ID of the calibrator who submitted this certificate |
| 2 | Calibrator name | Recording calibrator name | Calibrator name |
| 3 | Calibrator certificate number | Recording calibrator certificate number | Calibrator certificate number |
| 4 | Calibrator public key | Providing CA certificate for external verification | Public key of external signature of this calibrator |
| 5 | Signature from calibration institutions for the calibrator | Providing credibility authority of a calibration institution, and a calibration institution has credibility authority from supervision institutions indicates that this calibrator has been authorized in credibility | Signature data from calibration institutions for this calibrator |
| 6 | ID of the calibration institution that the calibrator belongs to | Detailed information of the calibration institution can be obtained by associating calibration institution chain 206 | ID of the calibration institution from which this certificate comes |
| 7 | ID of the last digital calibration certificate of this calibrator | A list of chains for all digital calibration certificates under this calibrator is provided by traceability of modification records for this ID | Corresponding to the ID of the last digital calibration certificate |
| 8 | Traceable high-precision time stamp | Giving a high-precision timestamp traceable to UTC | Same as the corresponding digital calibration certificate |

The verifier chain 208 is responsible for storing the information of approver who verified this calibration activity and content of the calibration certificate. It contains 8 data members (upgrade, addition or deletion of data members can be made based on this version, and a set of versions corresponds to a set of data structure definitions), and the roles/functions of the data members are described as follows:

| | | Verifier chain 208 | |
|---|---|---|---|
| Nos | Data member | Role/function | Description |
| 1 | Verifier ID | One ID corresponds to one verifier, providing fast positioning and traceability functions | ID of the verifier who submitted this certificate |
| 2 | Verifier name | Recording verifier name | Verifier name |
| 3 | Verifier certificate number | Recording verifier certificate number | Verifier certificate number |
| 4 | Public key | Providing CA certificate for external verification | Public key of external signature of this verifier |
| 5 | Signature from calibration institutions for the verifier | Providing credibility authority of a calibration institution, and a calibration institution has credibility authority from supervision institutions indicates that this verifier has been authorized in credibility | Signature data from calibration institutions for this verifier |
| 6 | ID of the calibration institution that the verifier belongs to | Detailed information of the calibration institution can be obtained by associating calibration institution chain 206 | ID of the calibration institution from which this certificate comes |
| 7 | ID of the last digital calibration certificate of this verifier | A list of chains for all digital calibration certificates under this verifier is provided by traceability of modification records for this ID | Corresponding to the ID of the last digital calibration certificate |
| 8 | Traceable high-precision time stamp | Giving a high-precision timestamp traceable to UTC | Same as the corresponding digital calibration certificate |

The approver chain 209 is responsible for storing the information of approver who approved that a calibration certificate can be generated from this calibration activity. It contains 8 data members (upgrade, addition or deletion of data members can be made based on this version, and a set of versions corresponds to a set of data structure definitions), and the roles/functions of the data members are described as follows:

| | | Approver chain 209 | |
|---|---|---|---|
| Nos | Data member | Role/function | Description |
| 1 | Approver ID | One ID corresponds to one approver, providing fast positioning and traceability functions | ID of the approver who submitted this certificate |
| 2 | Approver name | Recording approver name | Approver name |
| 3 | Approver certificate number | Recording calibrator certificate number | Approver certificate number |
| 4 | Public key | Providing CA certificate for external verification | Public key of external signature of this approver |
| 5 | Signature from calibration institutions for the approver | Providing credibility authority of a calibration institution, and a calibration institution has credibility authority from supervision institutions indicates that this approver has been authorized in credibility | Signature data from calibration institutions for this approver |
| 6 | ID of the calibration institution that the approver belongs to | Detailed information of the calibration institution can be obtained by associating calibration institution chain 206 | ID of the calibration institution from which this certificate comes |
| 7 | ID of the last digital calibration certificate of this approver | A list of chains for all digital calibration certificates under this approver is provided by traceability of modification records for this ID | Corresponding to the ID of the last digital calibration certificate |
| 8 | Traceable high-precision time stamp | Giving a high-precision timestamp traceable to UTC | Same as the corresponding digital calibration certificate |

The error verifier chain 210 is responsible for storing the information of error verifier who verified and confirmed that there is an error in this calibration activity and the calibration certificate is an incorrect certificate. It contains 8 data members (upgrade, addition or deletion of data members can be made based on this version, and a set of versions corresponds to a set of data structure definitions), and the roles/functions of the data members are described as follows:

| | | Error verifier chain 210 | |
|---|---|---|---|
| Nos | Data member | Role/function | Description |
| 1 | Error verifier ID | One ID corresponds to one error verifier, providing fast positioning and traceability functions | ID of the error verifier who submitted this incorrect certificate |
| 2 | Error verifier name | Recording error verifier name | Error verifier name |
| 3 | Error verifier certificate number | Recording error verifier certificate number | Error verifier certificate number |
| 4 | Public key | Providing CA certificate for external verification | Public key of external signature of this verifier |
| 5 | Signature from calibration institutions for the error verifier | Providing credibility authority of a calibration institution, and a calibration institution has credibility authority from supervision institutions indicates that this error verifier has been authorized in credibility | Signature data from calibration institutions for this verifier |
| 6 | ID of the calibration institution that the error verifier belongs to | Detailed information of the calibration institution can be obtained by associating calibration institution chain 206 | ID of the calibration institution from which this certificate comes |
| 7 | ID of the last digital calibration certificate of this error verifier | A list of chains for all digital calibration certificates under the error verifier is provided by traceability of modification records for this ID | Corresponding to the ID of the last digital calibration certificate |
| 8 | Traceable high-precision time stamp | Giving a high-precision timestamp traceable to UTC | Same as the corresponding digital calibration certificate |

Figure 3:
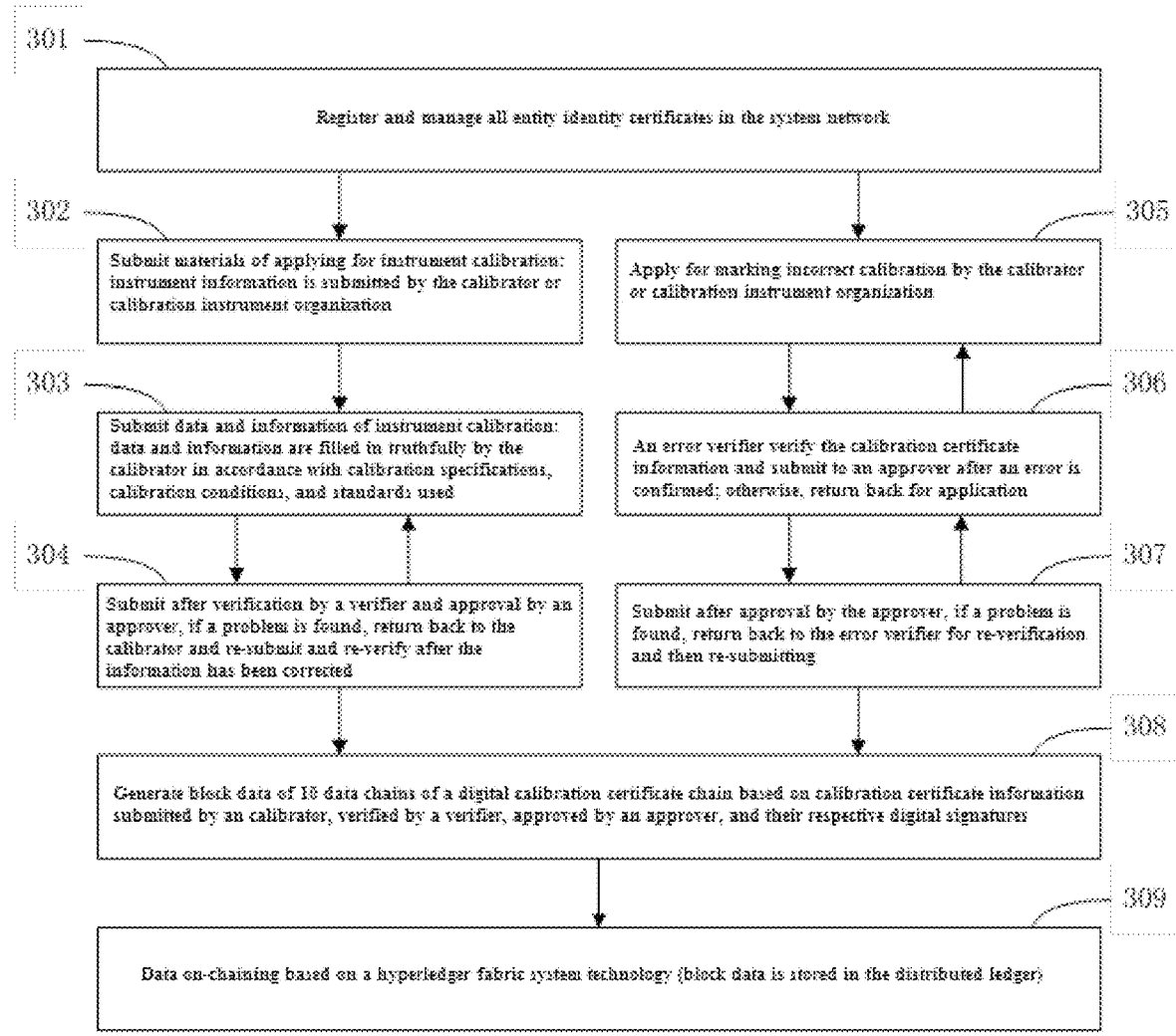
FIG. 3 is a schematic flow chart of an operation method of a trusted alliance block chain digital calibration certificate system according to an embodiment of the present invention.

FIG. 3 is a schematic flow chart of an operation method of a trusted alliance block chain digital calibration certificate system according to an embodiment of the present invention.

As shown in FIG. 3, the operation process of the trusted alliance block chain digital calibration certificate system comprises the following steps:

Step 301: a step for registering and managing all entity identity certificates in the system network.

The specific process comprises: register authorized entity information in the CA system 11 with the digital calibration certificate module 131 using the alliance management module 1314, the authorized entity information includes: measurement primary standards/standards (each measurement primary standard/standard contains the data member information of the measurement primary standard/standard chain 203: measurement primary standard/standard ID, measurement primary standard/standard certificate number, measurement primary standard/standard name), calibration specifications (each calibration specification contains the data member information of the calibration specification chain 202: calibration specification ID, calibration specification code, calibration specification name), the authorized calibration institution management module 1312 (each authorized calibration institution contains the data member information of the calibration institution chain 206: calibration institution ID, institution name, certificate number, calibration capability list, and signature from supervision institution for the calibration institution), national calibration capability list (each capability includes: authorization calibration/test project or parameter name, measurement range, accuracy class or expanded measurement uncertainty, name and number of technical files on which they are based).

The authorized calibration institution management module 1312 registers the related entity information in the CA system 11 with the digital calibration certificate module 131, the related entity information includes the following of the calibration institution: calibrators (each calibrator contains the data member information of the calibrator chain 207: calibrator ID, calibrator name, calibrator certificate number, and signature from calibration institutions for the calibrator), verifiers (each verifier contains the data member information of the verifier chain 208: verifier ID, verifier name, verifier certificate number, and signature from calibration institutions for the verifier), approvers (each approver contains the data member information of the approver chain 209: approver ID, approver name, approver certificate number, and signature from calibration institutions for the approver), error verifiers (each error verifier contains the data member information of the error verifier chain 210: error verifier ID, error verifier name, error verifier certificate number, and signature from calibration institutions for the error verifier). The authorized calibrator module 13121, verifier module 13122, approver module 13123, and error verifier module 13124 can enter the system, confirm information or change passwords, and obtain respective electronic signature private key/public key.

For a new calibration instrument organization management module 1313, it is necessary to register the information of the organization in the CA system 11 with the digital calibration certificate module 131 (information of organization comprises the data member information of the calibration equipment organization chain 205: calibration equipment organization ID, organization name, address, contact person, contact information), and the digital identity information of instrument or equipment needs to be newly added (each newly-added instrument or equipment comprises the definition information of data members in the calibration equipment chain 204: calibration equipment ID, calibration equipment model, calibration equipment specification, calibration equipment factory number, calibration equipment manufacturer, standard equipment organization ID).

For every newly-added entity, the digital identity information of this entity is added to ensure the entity entered into the system has qualified digital identity information.

Step 302: a step for submitting materials of applying for instrument calibration.

The specific process comprises submit instrument information by the calibrator or calibration instrument organization. That is, the calibrator submits application for calibration of instrument or equipment and submits the information of instrument or equipment meanwhile, with the digital calibration certificate module 131 using the calibrator module 13121 or the calibration instrument organization management module 1313. For a newly-added instrument or equipment, the digital identity information of this instrument or equipment needs to be newly added (each newly-added instrument or equipment comprises the definition information of data members in the calibration equipment chain 204: calibration equipment ID, calibration equipment model, calibration equipment specification, calibration equipment factory number, calibration equipment manufacturer, standard equipment organization ID).

Step 303: a step for submitting data and information of instrument calibration.

The specific process comprises: data and information are filled in truthfully by the calibrator in accordance with calibration specifications, calibration conditions, and standards used. That is, the calibrator module 13121 performs calibration on the instrument or equipment in accordance with calibration specifications, calibration conditions, and standards used. With the digital calibration certificate module 131, test data and information are filled in truthfully, then confirmed and submitted, thereby a digital signature generated (data members defined in the digital calibration certificate chain 201: digital signature 1 of the digital calibration certificate [calibrator]).

Step 304: a step for submitting data after verification by a verifier and approval by an approver.

The specific process comprises: through the digital calibration certificate module 131, submit after verification by the verifier module 13122 and approval by the approver module 13123. The verifier module 13122 confirms content of a verification certificate, that is, completes the digital signature (data members defined in the digital calibration certificate chain 201: digital signature 2 of the digital calibration certificate [verifier]). The approver module 13123 confirms generation of an approval certificate, that is, completes the digital signature (data members defined in the digital calibration certificate chain 201: digital signature 3 of the digital calibration certificate [approver]). The process also comprises the following step: if a problem is found, return back to the calibrator module 13121 and re-submit and re-verify after the information has been corrected.

Preferably, the above process may further comprise:

Step 305: a step for the calibrator or calibration instrument organization for applying for marking incorrect calibration.

The specific steps include: apply for marking incorrect calibration in the generated digital calibration certificate using the digital calibration certificate module 131 with the calibrator module 13121 or the calibration instrument organization management module 1313, and with the original calibrator module 13121, location, reason and correction method of the error are marked. After which, confirm and submission are performed, and the calibrator module 13121 completes the digital signature (data members defined in the digital calibration certificate chain 201: digital signature 1 of the digital calibration certificate [calibrator]).

Step 306: a step for an error verifier for verifying the calibration certificate information and submitting to an approver after an error is confirmed; otherwise, if other problems are found, return back to step 305 for application.

The specific steps include: verification of the calibration certificate information is performed by the error verifier module 13124 (not the verifier in the case of original certificate), and submission to the approver module 13123 is performed after an error confirmed; otherwise, return back to step 305 for application. For example: an error is confirmed, verified and submitted, then a digital signature of the error verifier is generated (data members defined in the digital calibration certificate chain 201: digital signature 4 of the digital calibration certificate [error verifier]).

Step 307: a step for submitting after approval by the approver; if a problem is found, step 306 is performed, that is, return back to the error verifier for re-verification and then re-submitting.

The specific steps include: submit after approval by the approver module 13123, if a problem is found, step 306 is performed, that is, return back to the error verifier module 13124 for re-verification and then re-submitting. For example: confirm an error and submit for approval, a digital signature of the approver module 13123 is generated (data members defined in the digital calibration certificate chain 201: digital signature 3 of the digital calibration certificate [approver]).

Step 308: a step for generating block data of multiple (10 in this embodiment) data chains of a digital calibration certificate chain based on calibration certificate information submitted by a calibrator, verified by a verifier, approved by an approver, and their respective digital signatures.

The specific steps include: generate block data of 10 data chains including the digital calibration certificate chain with the digital calibration certificate module 131 based on calibration certificate information submitted by the calibrator module 13121, verified by the verifier module 13122, approved by the approver module 13123, and their respective digital signatures (the block data structure shown in FIG. 2A and FIG. 2B).

Step 309: a step for the block data on-chaining based on a hyperledger fabric system technology.

The specific steps include: data on-chaining is performed for the block data through the block chain node with the digital calibration certificate module 131, based on a hyperledger fabric system technology. For example, the block data is stored in the block chain node 101 in the distributed ledger 10.

Further, if an error is found in the digital calibration certificate or a serious error is found in a calibration activity, the digital calibration certificate needs to be marked as incorrect, and step 305, step 306, step 307, step 308, and step 309 are performed. The corrected digital calibration certificate is processed as a newly added digital calibration certificate, that is, step 302, step 303, step 304, step 308, and step 309 are performed.

Further, the following is also comprised:

Step 310: a step for querying and processing the block data of the trusted block chain digital calibration certificate system. It specifically includes functions such as generation of calibration certificate (without limitation in format), verification of calibration certificate, download of calibration certificate, statistical analysis of calibration certificate, statistics of quantity value traceability, verification of measurement primary standard/standard, verification of calibration specification, verification of quantity value traceability, verification of institutional capability, assessment of calibrator, comparative analysis of calibration ability, calibration report of regional science. The digital certificate calibration system can use the above content as chain codes in smart contracts or as additional business functions of the digital calibration certificate system.

In summary, the present invention establishes a block chain system for digital calibration certificates based on a hyperledger fabric, and can simultaneously establish entity data chains closely related to the calibration certificate in the ledger system, and the entity data chains include 9 data block chains: a calibrator chain, a verifier chain, an approver chain, an error verifier chain, a calibration institution chain, an instrument certificate organization chain, a calibration equipment chain, a calibration specification chain, and a measurement primary standard/standard chain. Reliable and trusted calibration chains and traceability chains of quantity values, life chains of each calibration activity for measuring instruments, working chains of calibration behaviors for each calibration worker, working chains of calibration activities for each calibration institution are achieved. Each data chain is tamper-proof, non-repudiation, clearly visible, easy to verify, and efficient to trace. While realizing the features including tamper-proof, non-repudiation, machine-readable and computable, and secure and trusted, the "calibration chain" of a quantity value established not only ensures reliability of a single calibration node, but also makes "a calibration main chain and a measurement chain" of a quantity value obvious, easy to verify, and efficient for supervision.

With the block chain digital calibration certificate system of the present invention, the following can be achieved: consumers can quickly verify whether a measurement value specified by them has a calibration certificate, whether the measurement value is true and reliable, and whether a traceability chain of the quantity value is complete; instrument certificate organizations can quickly obtain traceability status of quantity values for all calibration instruments of the organizations such as whether it is compliant, whether the traceability chain of a quantity value is complete, what the grade it is, and the space for improvement, and others; calibration institutions can quickly obtain the true data of all certified calibration activities for the institutions, such as comparison of similar institutions, coverage and growth rate of quantity values, and others; government supervisors can quickly obtain statistics data on strength, weakness, coverage, and error rate for traceability chains of quantity values for a certain period of time in a certain area. The present invention makes all participants in metrological calibration activities easily obtain truly reliable calibration certificate information and statistical analysis data within their respective authority.

The description above is only the preferred embodiments of the present invention, and not intended to limit the claimed scope of the present invention.

The invention claimed is:

1. A trusted alliance block chain digital calibration certificate system, wherein the system comprises: a distributed ledger system, a certification authority CA system, a coordinated universal time UTC time calibration server, and a digital calibration certificate subsystem; wherein:

the distributed ledger system is a distributed storage system based on a hyperledger fabric, the distributed ledger system comprising at least one block chain node, and the block chain node is associated with the CA system, the UTC time calibration server, the digital calibration certificate subsystem and the public query subsystem, respectively;

the CA system is used for management of all entity identity certificates and registration of identities in the system;

the UTC time calibration server is used for providing a UTC time calibration service for all block chain node servers of the system, to ensure that the block chain node server time and data block built-in time stamps of the system have uniform high accuracy and are synchronized with the world standard time; and also ensure that information of each digital calibration certificate has the same ultra-high-precision time frequency information;

the digital calibration certificate subsystem is used for generating, by means of alliance management, instrument organization management, and calibration institution management, a digital calibration certificate from calibration certificate data by a digital signature technology;

a public query subsystem, which is used for providing for the public with query services including verifying authenticity of calibration certificates, verifying whether a measurement value specified thereof has a calibration certificate, and whether a traceability chain of a quantity value is complete that utilizes a unique digital identification number (ID) for retrieval and association; and extracting related entity information from the public query, and forming original information of multiple data blocks based on the ID in the query;

wherein the digital calibration certificate subsystem comprises a digital calibration certificate module, which further comprises a calibration institution management module, an instrument organization management module and an alliance management module; wherein, the calibration institution management module is an institution with calibration qualifications and calibration capabilities; the instrument organization management module is a functional module through which the calibration institution management module with commission for measuring instruments performs calibration on its instruments; the alliance management module is a maintainer for public and published information of an alliance chain;

wherein the calibration institution management module further comprises a calibrator module, a verifier module, an approver module and an error verifier module.

2. The trusted alliance block chain digital calibration certificate system of claim 1, wherein the calibration certificate data specifically is data that has been submitted by a calibrator, verified by a verifier, and approved by an approver.

3. A method for implementing a trusted alliance block chain digital calibration certificate system, wherein the system comprises: a distributed ledger system, a certification authority CA system, a coordinated universal time UTC time calibration server, and a digital calibration certificate subsystem; wherein: the distributed ledger system is a distributed storage system based on a hyperledger fabric, the distributed ledger system comprising at least one block chain node, and the block chain node is associated with the CA system, the UTC time calibration server, the digital calibration certificate subsystem and the public query subsystem, respectively; the CA system is used for management of all entity identity certificates and registration of identities in the system; the UTC time calibration server is used for providing a UTC time calibration service for all block chain node servers of the system, to ensure that the block chain node server time and data block built-in time stamps of the system have uniform high accuracy and are synchronized with the world standard time; and also ensure that information of each digital calibration certificate has the same ultra-high-precision time frequency information; the digital calibration certificate subsystem is used for generating, by means of alliance management, instrument organization management, and calibration institution management, a digital calibration certificate from calibration certificate data by a digital signature technology; a public query subsystem, which is used for providing for the public with query services including verifying authenticity of calibration certificates, verifying whether a measurement value specified thereof has a calibration certificate, and whether a traceability chain of a quantity value is complete that utilizes a unique digital identification number (ID) for retrieval and association; and extracting related entity information from the public query, and forming original information of multiple data blocks based on the ID in the query; wherein the digital calibration certificate subsystem comprises a digital calibration certificate module, which further comprises a calibration institution management module, an instrument organization management module and an alliance management module; wherein, the calibration institution management module is an institution with calibration qualifications and calibration capabilities; the instrument organization management module is a functional module through which the calibration institution management module with commission for measuring instruments performs calibration on its instruments; the alliance management module is a maintainer for public and published information of an alliance chain; wherein the calibration institution management module further comprises a calibrator module, a verifier module, an approver module and an error verifier module, wherein the method comprises the following steps:

registering and managing all entity identity certificates in the system network;

submitting materials of applying for instrument calibration;

submitting data and information of instrument calibration;

submitting data after verification by a verifier and approval by an approver for generating block data of multiple data chains of a digital calibration certificate chain based on calibration certificate information submitted by a calibrator, verified by a verifier, approved by an approver, and their respective digital signatures; and storing the block data on a hyperledger fabric system technology.

4. The operation method of a trusted alliance block chain digital calibration certificate system of claim 3, wherein submitting data after verification by a verifier and approval by an approver further comprises, if a problem is found, return back to submitting data and information of instrument calibration, and re-submit and re-verify after the information has been corrected by a calibrator module.

5. The operation method of a trusted alliance block chain digital calibration certificate system of claim 3, wherein, after registering and managing all entity identity certificates in the system network, further comprising:

a step for the calibrator or calibration instrument organization for applying for marking incorrect calibration;

a step for an error verifier for verifying the calibration certificate information and submitting to an approver after an error is confirmed;

a step for submitting after approval by the approver, and then performing the step of generating block data of multiple data chains of a digital calibration certificate chain based on calibration certificate information submitted by a calibrator, verified by a verifier, approved by an approver, and their respective digital signatures.

6. The operation method of a trusted alliance block chain digital calibration certificate system of claim 5, wherein the step for an error verifier for verifying the calibration certificate information and submitting to an approver after an error is confirmed further comprises the following step:

if other problems are found, return back to the step for the calibrator or calibration instrument organization for applying for marking incorrect calibration for application.

7. The operation method of a trusted alliance block chain digital calibration certificate system of claim 5, wherein the step for submitting after approval by the approver, and then performing the step of generating block data of multiple data chains of a digital calibration certificate chain based on calibration certificate information submitted by a calibrator, verified by a verifier, approved by an approver, and their respective digital signatures further comprises the following step:

if a problem is found, perform the step for an error verifier for verifying the calibration certificate information and submitting to an approver after an error is confirmed.

8. The operation method of a trusted alliance block chain digital calibration certificate system according to claim 3, wherein, after the step of storing the block data on a hyperledger fabric system technology, further comprising:

querying and processing the block data of the trusted block chain digital calibration certificate system.

\* \* \* \* \*